(12) United States Patent
Suzuki et al.

(10) Patent No.: US 6,987,957 B2
(45) Date of Patent: Jan. 17, 2006

(54) DUAL-BAND FREQUENCY CONVERTER UNIT WITH HIGH OPERABILITY

(75) Inventors: Takeo Suzuki, Fukushima-ken (JP); Shoichi Asano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 482 days.

(21) Appl. No.: 10/382,278

(22) Filed: Mar. 5, 2003

(65) Prior Publication Data
US 2003/0171101 A1 Sep. 11, 2003

(30) Foreign Application Priority Data
Mar. 6, 2002 (JP) .............................. 2002-060757

(51) Int. Cl.
*H04N 1/00* (2006.01)
(52) U.S. Cl. ................ 455/147; 455/168.1; 455/552.1; 455/87
(58) Field of Classification Search ................ 455/147, 455/168.1, 76.86, 87, 84, 85, 552.1, 553.1, 455/318, 313, 323, 130, 141, 118, 164.1, 455/182.1, 255, 176.1, 180.1, 188.1
See application file for complete search history.

(56) References Cited

U.S. PATENT DOCUMENTS

| | | | |
|---|---|---|---|
| 5,535,432 A * | 7/1996 | Dent | 455/76 |
| 6,256,511 B1 * | 7/2001 | Brown et al. | 455/552.1 |
| 6,574,462 B1 * | 6/2003 | Strange | 455/313 |
| 6,775,531 B1 * | 8/2004 | Kaewell et al. | 455/343.1 |
| 2002/0132597 A1 * | 9/2002 | Peterzell et al. | 455/130 |
| 2003/0040292 A1 * | 2/2003 | Peterzell et al. | 455/147 |
| 2003/0157909 A1 * | 8/2003 | Atkinson et al. | 455/130 |
| 2003/0207668 A1 * | 11/2003 | McFarland et al. | 455/3.01 |
| 2004/0204036 A1 * | 10/2004 | Yang | 455/553.1 |
| 2005/0159180 A1 * | 7/2005 | Cheng et al. | 455/552.1 |

FOREIGN PATENT DOCUMENTS

JP 2002-280924 9/2002

* cited by examiner

*Primary Examiner*—Aung Moe
(74) *Attorney, Agent, or Firm*—Brinks Hofer Gilson & Lione

(57) ABSTRACT

A dual-band frequency converter unit, for selectively performing frequency conversion between a 2.4-GHz high-frequency-band signal or a 5-GHz high-frequency-band signal and a baseband signal by frequency mixing, includes a local oscillator for generating a local oscillation signal; a first frequency divider for generating a half-frequency signal of the local oscillation signal; and a second frequency divider for generating a quarter-frequency signal of the local oscillation signal. Frequency conversion between the 2.4-GHz high-frequency-band signal and the baseband signal is performed by frequency mixing using the half-frequency signal of the local oscillation signal. Frequency conversion between the 5-GHz high-frequency-band signal and the baseband signal is performed by frequency mixing using the local oscillation signal and the quarter-frequency signal of the local oscillation signal.

4 Claims, 2 Drawing Sheets

(2.4-GHz BAND) 4.824 – 4.944 GHz, 2.412 – 2.472 GHz, 1.206 – 1.236 GHz
(5-GHz BAND)  4.136 – 4.256 GHz, 2.068 – 2.128 GHz, 1.034 – 1.064 GHz

DUAL-BAND FREQUENCY CONVERTER UNIT WITH HIGH OPERABILITY

BACKGROUND OF THE INVENTION

1. Field of the Invention

The present invention relates to dual-band frequency converter units and, more particularly, to a dual-band frequency converter unit that selectively performs frequency conversion of 2.4-GHz high-frequency-band signals or 5-GHz high-frequency-band signals and baseband signals by frequency mixing a local oscillator with both of the high-frequency-band signals.

2. Description of the Related Art

Short-range radio communication systems for, for example, wireless local area networks (LANs), generally communicate using 2.4-GHz frequency-band signals, specifically, signals within the frequency range between 2.412 GHz and 2.472 GHz. The 2.4-GHz frequency-band signals have few restrictions (for example, they require no license for use), and therefore short-range radio communication systems for 2.4-GHz frequency-band signals can be utilized for various applications, such as cell phones, and their range of applications is expanding.

Since the utilization of the 2.4-GHz frequency-band signals has been pushed to the limit in recent years, the availability of 5-GHz high-frequency-band signals, specifically signals within the frequency range between 5.17 GHz and 5.32 GHz, which are ordinarily used only for communication, is being discussed. Some short-range radio communication systems that communicate using 5-GHz high-frequency-band signals have already been put into practical use.

Short-range radio communication systems that communicate using 5-GHz high-frequency-band have been put into practical use. However, since and the prevalence of short-range radio communication systems that communicate using 5-GHz high-frequency-band signals is smaller than that of short-range radio communication systems that communicate using 2.4-GHz frequency-band signals, their applicability is limited. To realize short-range radio communication systems for both of the 2.4-GHz frequency-band signals and the 5-GHz high-frequency-band signals, two kinds of short-range radio communication systems, that is, a short-range radio communication system that communicates using 2.4-GHz frequency-band signals and a short-range radio communication system that communicates using 5-GHz high-frequency-band signals, must be selectively used depending on the situation. This not only requires time and effort, but also increases the production cost.

SUMMARY OF THE INVENTION

Accordingly, it is an object of the present invention to provide a dual-band frequency converter unit with a low production cost and high operability by providing a local oscillator used with two frequency bands in the frequency converter unit.

The present invention provides, in its first aspect, a dual-band frequency converter unit for selectively performing frequency conversion to generate a 2.4-GHz high-frequency-band signal or 5-GHz high-frequency-band signal and a baseband signal through frequency mixing. The dual-band frequency converter unit includes a local oscillator for generating a local oscillation signal; a first frequency divider for generating a half-frequency signal of the local oscillation signal; and a second frequency divider for generating a quarter-frequency signal of the local oscillation signal. Frequency conversion that generates the 2.4-GHz high-frequency-band signal and the baseband signal is performed by frequency mixing using the half-frequency signal of the local oscillation signal. Frequency conversion that generates the 5-GHz high-frequency-band signal and the baseband signal is performed by frequency mixing using the local oscillation signal and the quarter-frequency signal of the local oscillation signal.

With such a dual-band frequency converter unit, the local oscillator can be used for both a frequency conversion that generates the 2.4-GHz high-frequency-band signal and that generates the 5-GHz high-frequency-band signal, thus realizing a dual-band frequency converter unit having a low production cost and high operability.

The 2.4-GHz high-frequency-band signal preferably is within a frequency range between 2.412 GHz and 2.472 GHz and the 5-GHz high-frequency-band signal preferably is within the frequency range between 5.17 GHz and 5.32 GHz.

It is preferable that the local oscillation signal be within the frequency range between 4.136 GHz and 4.944 GHz, the half-frequency signal be within the frequency range between 2.068 GHz and 2.472 GHz, and the quarter-frequency signal be within the frequency range between 1.034 GHz and 1.236 GHz.

With such features, the frequency range of the local oscillation signal can be within a variation range of the frequency of the local oscillator, thus generating a local oscillation signal with stable frequency.

The local oscillation signal preferably is within the frequency range between 4.824 GHz and 4.944 GHz when the 2.4-GHz high-frequency-band signal is transmitted or received and preferably is within the frequency range between 4.136 GHz and 4.256 GHz when the 5-GHz high-frequency-band signal is transmitted or received.

With such a feature, local oscillation signals within the most appropriate frequency ranges can be generated when the 2.4-GHz high-frequency-band signal and the 5-GHz high-frequency-band signal are transmitted or received.

DESCRIPTION OF THE PREFERRED EMBODIMENTS

Embodiments of the present invention will now be described with reference to the attached drawings.

Figure 1:
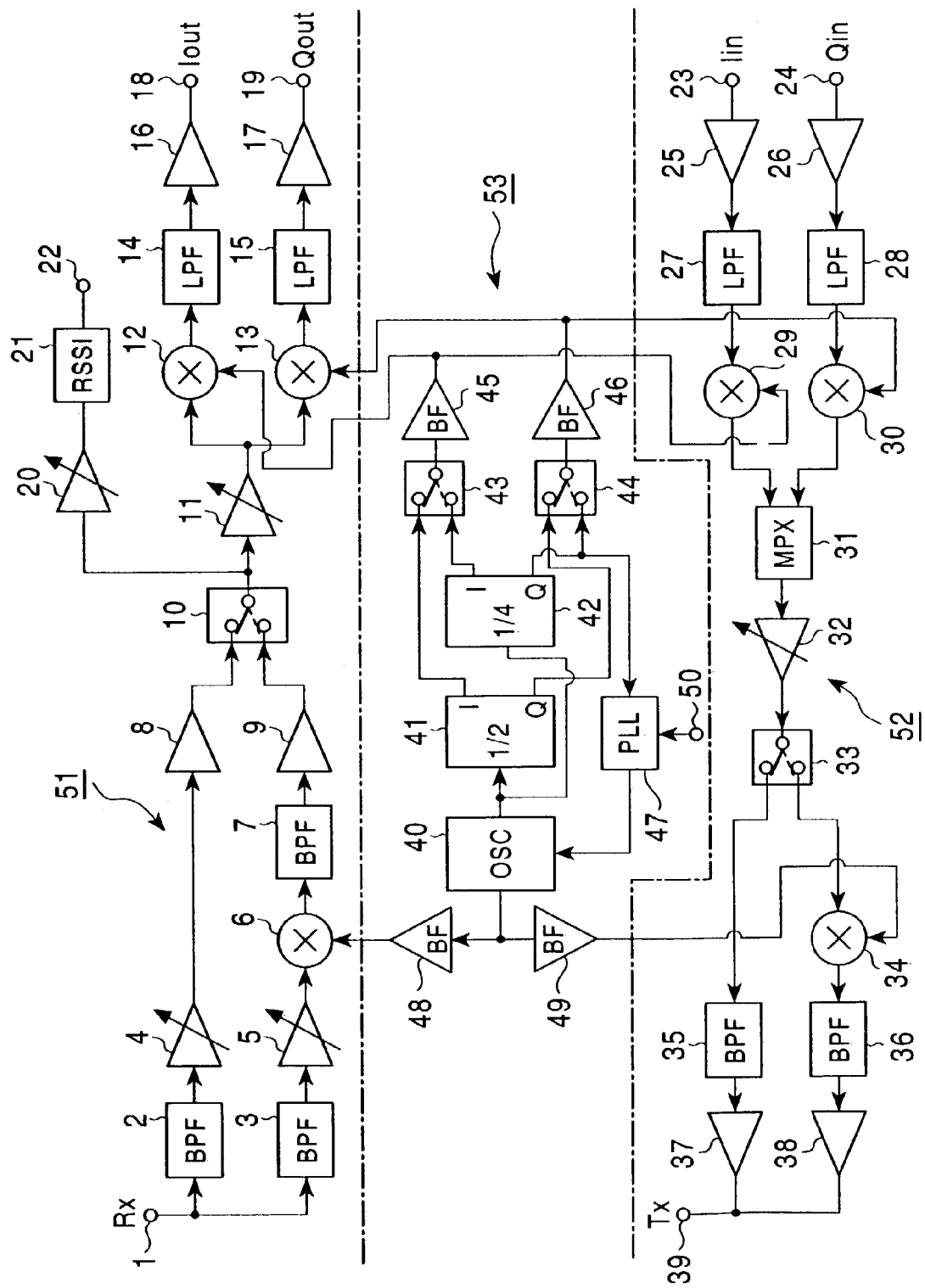
FIG. 1 is a block diagram showing the main part of a dual-band frequency converter unit according to an embodiment of the present invention.

FIG. 1 is a block diagram showing the main part of a dual-band frequency converter unit according to an embodiment of the present invention.

Referring to FIG. 1, the dual-band frequency converter unit includes a receiver section 51, a transmitter section 52, and a local oscillator section 53.

The receiver section 51 includes a high-frequency signal input terminal (Rx) 1, a first bandpass filter (BPF) 2, a second BPF 3, a first automatic gain control amplifier 4, a second automatic gain control amplifier 5, a first frequency mixer 6, a third BPF 7, a first high-frequency amplifier 8, a second high-frequency amplifier 9, a first switch 10, a third automatic gain control amplifier 11, a second frequency mixer 12, a third frequency mixer 13, a first low-pass filter LPF (LPF) 14, a second LPF 15, a first baseband signal amplifier 16, a second baseband signal amplifier 17, an in-phase signal output terminal (Iout) 18, a quadrature signal output terminal (Qout) 19, an inverting automatic-gain-control amplifier 20, a signal strength detector (RSSI) 21, and a detection signal output terminal 22.

The transmitter section 52 includes an in-phase signal input terminal (Iin) 23, a quadrature signal input terminal (Qin) 24, a third baseband signal amplifier 25, a fourth baseband signal amplifier 26, a third LPF 27, a fourth LPF 28, a fourth frequency mixer 29, a fifth frequency mixer 30, a multiplexer (MPX) 31, a fourth automatic gain control amplifier 32, a second switch 33, a sixth frequency mixer 34, a fourth BPF 35, a fifth BPF 36, a third high-frequency amplifier 37, a fourth high-frequency amplifier 38, and a high-frequency signal output terminal (Tx) 39.

The local oscillator section 53 includes a local oscillator 40, a divide-by-two frequency divider 41, a divide-by-four frequency divider 42, a third switch 43, a fourth switch 44, a first buffer amplifier (BF) 45, a second BF 46, a phase-locked loop (PLL) 47, a third BF 48, a fourth BF 49, and a control signal feed terminal 50.

In the receiver section 51, the input of the first BPF 2 is connected to the high-frequency signal input terminal (Rx) 1 and the output thereof is connected to the input of the first automatic gain control amplifier 4. The input of the second BPF 3 is connected to the high-frequency signal input terminal (Rx) 1 and the output thereof to the input of the second automatic gain control amplifier 5. The first input of the first frequency mixer 6 is connected to the output of the second automatic gain control amplifier 5, the second input thereof is connected to the output of the third BF 48, and the output thereof is connected to the input of the third BPF 7. The input of the first high-frequency amplifier 8 is connected to the output of the first automatic gain control amplifier 4 and the output thereof is connected to a first fixed contact of the first switch 10. The input of the second high-frequency amplifier 9 is connected to the output of the third BPF 7 and the output thereof is connected to a second fixed contact of the first switch 10. The movable contact of the first switch 10 is connected to the input of the third automatic gain control amplifier 11 and is also connected to the input of the inverting automatic-gain-control amplifier 20. The first input of the second frequency mixer 12 is connected to the output of the third automatic gain control amplifier 11, the second input thereof is connected to the output of the first BF 45, and the output thereof is connected to the input of the first LPF 14. The first input of the third frequency mixer 13 is connected to the output of the third automatic gain control amplifier 11, the second input thereof is connected to output of the second BF 46, and the output thereof is connected to the input of the second LPF 15. The input of the first baseband signal amplifier 16 is connected to the output of the first LPF 14 and the output thereof is connected to the in-phase signal output terminal (Iout) 18. The input of the second baseband signal amplifier 17 is connected to the output of the second LPF 15 and the output thereof is connected to the quadrature signal output terminal (Qout) 19. The input of the signal strength detector 21 is connected to the output of the inverting automatic-gain-control amplifier 20 and the output thereof is connected to the detection signal output terminal 22.

In the transmitter section 52, the input of the third baseband signal amplifier 25 is connected to the in-phase signal input terminal (Iin) 23 and the output thereof is connected to the input of the third LPF 27. The input of the fourth baseband signal amplifier 26 is connected to the quadrature signal input terminal (Qin) 24 and the output thereof is connected to the input of the fourth LPF 28. The first input of the fourth frequency mixer 29 is connected to the output of the third LPF 27, the second input thereof is connected to the output of the first BF 45, and the output thereof is connected to the first input of the multiplexer 31. The first input of the fifth frequency mixer 30 is connected to the output of the fourth LPF 28, the second input thereof is connected to the output of the second BF 46, and the output thereof is connected to the second input of the multiplexer 31. The input of the fourth automatic gain control amplifier 32 is connected to the output of the multiplexer 31 and the output thereof is connected to the movable contact of the second switch 33. The first input of the sixth frequency mixer 34 is connected to a first fixed contact of the second switch 33, the second input thereof is connected to the output of the fourth BF 49, and the output thereof is connected to the input of the fifth BPF 36. The output of the fifth BPF 36 is connected to the input of the fourth high-frequency amplifier 38 and the output of the fourth high-frequency amplifier 38 is connected to the high-frequency signal output terminal (Tx) 39. The input of the fourth BPF 35 is connected to a second fixed contact of the second switch 33 and the output thereof is connected to the input of the third high-frequency amplifier 37. The output of the third high-frequency amplifier 37 is connected to the high-frequency signal output terminal (Tx) 39.

In the local oscillator section 53, the outputs of the local oscillator 40 are connected to the input of the divide-by-two frequency divider 41, the input of the divide-by-four frequency divider 42, the input of the third BF 48, and the input of the fourth BF 49. The control terminal of the local oscillator 40 is connected to the output of the phase-locked loop 47. The in-phase output (I) of the divide-by-two frequency divider 41 is connected to a first fixed contact of the third switch 43 and the quadrature output (Q) thereof is connected to a first fixed contact of the fourth switch 44. The in-phase output (I) of the divide-by-four frequency divider 42 is connected to a second fixed contact of the third switch 43, and the quadrature output (Q) thereof is connected to a second fixed contact of the fourth switch 44 and to the input of the phase-locked loop 47. The movable contact of the third switch 43 is connected to the input of the first BF 45. The movable contact of the fourth switch 44 is connected to the input of the second BF 46. The control terminal of the phase-locked loop 47 is connected to the control signal feed terminal 50.

The dual-band frequency converter unit having the circuit configuration described above according to the embodiment of the present invention operates in the following manner.

When a 2.4-GHz high-frequency-band signal is transmitted or received, the respective movable contacts of the first switch 10, the second switch 33, the third switch 43, and the fourth switch 44 are switched to one of the respective first fixed contacts shown by solid lines in FIG. 1 and the phase-locked loop 47 is controlled by supplying a control signal to the control signal feed terminal 50 to set the frequency range of a local oscillation signal generated in the local oscillator 40 to a frequency range between 4.824 GHz and 4.944 GHz. When a 5-GHz high-frequency-band signal is transmitted or received, the respective movable contacts of the first switch 10, the second switch 33, the third switch 43, and the fourth switch 44 are switched to the respective second fixed contacts shown by broken lines in FIG. 1, and the phase-locked loop 47 is controlled by supplying the control signal to the control signal feed terminal 50 to set the frequency range of the local oscillation signal generated in the local oscillator 40 to a frequency range between 4.136 GHz and 4.256 GHz. The 2.4-GHz high-frequency-band signal to be used is within the frequency range between 2.412 GHz and 2.472 GHz and the 5-GHz high-frequency-band signal to be used is within the frequency range between 5.17 GHz and 5.32 GHz.

The circuit operation during transmission or reception of the 2.4-GHz high-frequency-band signal will now be described. When the 2.4-GHz high-frequency-band signal is transmitted or received, the respective movable contacts of the first switch 10, the second switch 33, the third switch 43, and the fourth switch 44 are switched to the respective first fixed contacts shown by the solid lines in FIG. 1, and the local oscillator 40 generates the local oscillation signal within the frequency range between 4.824 GHz and 4.944 GHz, as described above. The divide-by-two frequency divider 41 generates a half-frequency signal within the frequency range between 2.412 GHz and 2.472 GHz in response to this local oscillation signal. The divide-by-four frequency divider 42 generates a quarter-frequency signal within the frequency range between 1.206 and 1.236 GHz in response to the local oscillation signal. The half-frequency signal generated by the divide-by-two frequency divider 41 includes an in-phase half-frequency signal (I) that is in phase with the local oscillation signal and a quadrature half-frequency signal (Q) that is out of phase with the in-phase half-frequency signal (I) by 90°. The quarter-frequency signal generated by the divide-by-four frequency divider 42 includes an in-phase quarter-frequency signal (I) that is in phase with the local oscillation signal and a quadrature quarter-frequency signal (Q) that is out of phase with the in-phase quarter-frequency signal (I) by 90°.

In this case, the frequency of the local oscillation signal generated in the local oscillator 40 is controlled by the phase-locked loop 47 in accordance with the frequency of the transmitted or received high-frequency signal determined continuously in time. The frequencies of the half-frequency signal and the quarter-frequency signal are determined by the frequency of the local oscillation signal.

When the high-frequency signal input terminal (Rx) 1 receives the 2.4-GHz high-frequency-band signal, undesired components of the received signal are removed in the first BPF 2 and the received signal undergoes automatic-gain-control amplification in the first automatic gain control amplifier 4. The received signal is then amplified by the first high-frequency amplifier 8 and supplied to the first fixed contact of the first switch 10. Since the movable contact of the first switch 10 is switched to first fixed contact, the received signal passes thorough the first switch 10 and undergoes automatic-gain-control amplification again in the third automatic gain control amplifier 11. Then, an in-phase received signal (I) that is in phase with the received signal is supplied to the second frequency mixer 12 and a quadrature received signal (Q) that is out of phase with the received signal (I) by 90° is supplied to the third frequency mixer 13. In the local oscillator section 53, the divide-by-two frequency divider 41 generates the in-phase half-frequency signal (I) of the local oscillation signal and the quadrature half-frequency signal (Q) that is out of phase with the in-phase half-frequency signal (I) by 90°. The in-phase half-frequency signal (I) is supplied to the first fixed contact of the third switch 43 and the quadrature half-frequency signal (Q) is supplied to the first fixed contact of the fourth switch 44. The movable contact of the third switch 43 is switched to the first fixed contact and the movable contact of the fourth switch 44 is switched to the first fixed contact. Hence, the in-phase half-frequency signal (I) passes through the third switch 43 toward the second frequency mixer 12 via the first BF 45. The quadrature half-frequency signal (Q) passes through the fourth switch 44 toward the third frequency mixer 13 via the second BF 46.

The second frequency mixer 12 mixes the frequencies of the in-phase received signal (I) and the in-phase half-frequency signal (I) and supplies the frequency-mixed signal to the first LPF 14. Similarly, the third frequency mixer 13 mixes the frequencies of the quadrature received signal (Q) and the quadrature half-frequency signal (Q) and supplies the frequency-mixed signal to the second LPF 15. The first LPF 14 extracts an in-phase baseband signal (I) component from the frequency-mixed signal. The in-phase baseband signal (I) component having a frequency that is equal to the frequency difference between the in-phase received signal (I) and the in-phase half-frequency signal (I). The extracted in-phase baseband signal (I) is amplified by the first baseband signal amplifier 16 and supplied to the in-phase signal output terminal (Iout) 18. The second LPF 15 extracts a quadrature baseband signal (Q) component from the frequency-mixed signal. The quadrature baseband signal (Q) component having a frequency that is equal to the frequency difference between the quadrature received signal (Q) and the quadrature half-frequency signal (Q). The extracted quadrature baseband signal (Q) is amplified by the second baseband signal amplifier 17 and supplied to the quadrature signal output terminal (Qout) 19.

Some components of the received signal output from the first switch 10 are supplied to the inverting automatic gain control amplifier 20. The inverting automatic gain control amplifier 20 outputs a signal to the signal strength detector 21. The level of the output signal varies substantially in the same manner as the received signal input to the first automatic gain control amplifier 4. The inverting automatic gain control amplifier 20 has a characteristic inverted with respect to the automatic gain control amplification characteristic provided by the first automatic gain control amplifier 4. The signal strength detector 21 detects the signal strength of the received signal and supplies a detection signal representing the detected signal strength to the detection signal output terminal 22.

During transmission of the high-frequency signal, when the in-phase baseband signal (I) is supplied to the in-phase signal input terminal (Iin) 23, the supplied in-phase baseband signal (I) is amplified by the third baseband signal amplifier 25. After undesired components of the in-phase baseband signal (I) are removed in the third LPF 27, the in-phase baseband signal (I) is supplied to the fourth frequency mixer 29. When the quadrature baseband signal (Q) is supplied to the quadrature signal input terminal (Qin) 24, the supplied quadrature baseband signal (Q) is amplified by the fourth baseband signal amplifier 26. After undesired components of the quadrature baseband signal (Q) are removed in the fourth LPF 28, the quadrature baseband signal (Q) is supplied to the fifth frequency mixer 30.

In the local oscillator section 53, the divide-by-two frequency divider 41 generates the in-phase half-frequency signal (I) and the quadrature half-frequency signal (Q) of the local oscillation signal. The in-phase half-frequency signal (I) is supplied to the first fixed contact of the third switch 43 and the quadrature half-frequency signal (Q) is supplied to the first fixed contact of the fourth switch 44. The movable contact of the third switch 43 is switched to the first fixed contact and the movable contact of the fourth switch 44 is switched to the first fixed contact. Hence, the in-phase half-frequency signal (I) passes through the third switch 43 toward the fourth frequency mixer 29 via the first BF 45. The quadrature half-frequency signal (Q) passes through the fourth switch 44 toward the fifth frequency mixer 30 via the second BF 46.

The fourth frequency mixer 29 mixes the frequencies of the in-phase baseband signal (I) and the in-phase half-frequency signal (I) to supply the frequency-mixed signal, which is a sum-frequency signal of the in-phase baseband signal and the in-phase half-frequency signal, to the multiplexer 31. Similarly, the fifth frequency mixer 30 mixes the frequencies of the quadrature baseband signal (Q) and the quadrature half-frequency signal (Q) to supply the frequency-mixed signal, which is a sum-frequency signal of the quadrature baseband signal and the quadrature half-frequency signal, to the multiplexer 31. The multiplexer 31 generates the 2.4-GHz high-frequency-band signal based on the two frequency-mixed signals supplied. The generated transmitted signal undergoes automatic-gain-control amplification in the fourth automatic gain control amplifier 32 and is supplied to the movable contact of the second switch 33. Since the movable contact of the second switch 33 is switched to the first fixed contact, the transmitted signal passes through the second switch 33 and undesired frequency components of the transmitted signal are removed in the fourth BPF 35. The transmitted signal is amplified by the third high-frequency amplifier 37 to increase the transmission level and is supplied to the high-frequency signal output terminal (Tx) 39.

The circuit operation during transmission or reception of the 5-GHz high-frequency-band signal will now be described. When the 5-GHz high-frequency-band signal is transmitted or received, the respective movable contacts of the first switch 10, the second switch 33, the third switch 43, and the fourth switch 44 are switched to the respective second fixed contacts shown by the broken lines in FIG. 1, and the local oscillator 40 generates a local oscillation signal within the frequency range between 4.136 GHz and 4.256 GHz, as described above. The divide-by-two frequency divider 41 generates an in-phase half-frequency signal (I) and a quadrature half-frequency signal (Q) within the frequency range between 2.068 GHz and 2.128 GHz in response to this local oscillation signal. The divide-by-four frequency divider 42 generates an in-phase quarter-frequency signal (I) and a quadrature quarter-frequency signal (Q) within the frequency range between 1.034 and 1.064 GHz in response to the local oscillation signal. In this case, the frequency of the local oscillation signal generated in the local oscillator 40 is controlled by the phase-locked loop 47 in accordance with the frequency of the transmitted or received high-frequency signal determined continuously in time. The frequencies of the in-phase half-frequency signal (I) and the quadrature half-frequency signal (Q) and those of the in-phase quarter-frequency signal (I) and the quadrature quarter-frequency signal (Q) are determined through the frequency of the local oscillation signal.

When the high-frequency signal input terminal (Rx) 1 receives the 5-GHz high-frequency-band signal, undesired components of the received signal are removed by the second BPF 3 and then the received signal undergoes an automatic-gain-control amplification in the second automatic gain control amplifier 5 before it is supplied to the first frequency mixer 6. In the local oscillator section 53, the local oscillator 40 generates the local oscillation signal that is amplified by the third BF 48 and supplied to the first frequency mixer 6. The first frequency mixer 6 mixes the frequencies of the received signal and the local oscillation signal and supplies the frequency-mixed signal to the third BPF 7. The third BPF 7 extracts an intermediate-frequency signal component from the frequency-mixed signal. The intermediate-frequency signal component has a frequency that is equal to the frequency difference between the received signal and the local oscillation signal. The intermediate-frequency signal is then amplified by the second high-frequency amplifier 9 and is supplied to the second fixed contact of the first switch 10.

Since the movable contact of the first switch 10 is switched to the second fixed contact, the intermediate-frequency signal passes through the first switch 10 and undergoes an automatic-gain-control amplification in the third automatic gain control amplifier 11. Then, an in-phase intermediate-frequency signal (I), that is in phase with the intermediate-frequency signal, is supplied to the second frequency mixer 12. A quadrature intermediate-frequency signal (Q) that is out of phase with the intermediate-frequency signal (I) by 90° is supplied to the third frequency mixer 13.

In the local oscillator section 53, the divide-by-four frequency divider 42 generates the in-phase quarter-frequency signal (I) of the local oscillation signal and the quadrature quarter-frequency signal (Q) that is out of phase with the in-phase quarter-frequency signal (I) by 90°. The in-phase quarter-frequency signal (I) is supplied to the second fixed contact of the third switch 43 and the quadrature quarter-frequency signal (Q) is supplied to the second fixed contact of the fourth switch 44. Since the movable contact of the third switch 43 is switched to the second fixed contact and the movable contact of the fourth switch 44 is switched to the second fixed contact, the in-phase quarter-frequency signal (I) passes through the third switch 43 toward the second frequency mixer 12 via the first BF 45. The quadrature quarter-frequency signal (Q) passes through the fourth switch 44 toward the third frequency mixer 13 via the second BF 46.

The second frequency mixer 12 mixes the frequencies of the in-phase intermediate-frequency signal (I) and the in-phase quarter-frequency signal (I) to supply the frequency-mixed signal to the first LPF 14. Similarly, the third frequency mixer 13 mixes the frequencies of the quadrature intermediate-frequency signal (Q) and the quadrature quarter-frequency signal (Q) to supply the frequency-mixed signal to the second LPF 15. The first LPF 14 extracts an in-phase baseband signal (I) component from the frequency-mixed signal. The in-phase baseband signal (I) component has a frequency that is equal to the frequency difference between the in-phase intermediate-frequency signal (I) and the in-phase quarter-frequency signal (I). The extracted in-phase baseband signal (I) is amplified by the first baseband signal amplifier 16 and is supplied to the in-phase signal output terminal (Iout) 18. The second LPF 15 extracts a quadrature baseband signal (Q) component from the frequency-mixed signal. The quadrature baseband signal (Q) component has a frequency that is equal to the frequency difference between the quadrature intermediate-frequency signal (Q) and the quadrature quarter-frequency signal (Q). The extracted quadrature baseband signal (Q) is amplified by the second baseband signal amplifier 17 and is supplied to the quadrature signal output terminal (Qout) 19.

Some components of the intermediate-frequency signal output from the first switch 10 are supplied to the inverting automatic gain control amplifier 20. The inverting automatic gain control amplifier 20 outputs an intermediate-frequency signal to the signal strength detector 21. The level of the intermediate-frequency signal varies substantially in the same manner as the received signal input to the first automatic gain control amplifier 4. The signal strength detector 21 detects the signal strength of the intermediate-frequency signal and supplies a detection signal representing the detected signal strength to the detection signal output terminal 22.

During transmission of the high-frequency signal, when the in-phase baseband signal (I) is supplied to the in-phase signal input terminal (Iin) 23, the supplied in-phase baseband signal (I) is amplified by the third baseband signal amplifier 25. After undesired components of the in-phase baseband signal (I) are removed in the third LPF 27, the in-phase baseband signal (I) is supplied to the fourth frequency mixer 29. When the quadrature baseband signal (Q) is supplied to the quadrature signal input terminal (Qin) 24, the quadrature baseband signal (Q) is amplified by the fourth baseband signal amplifier 26. After undesired components of the quadrature baseband signal (Q) are removed by the fourth LPF 28, the quadrature baseband signal (Q) is supplied to the fifth frequency mixer 30.

In the local oscillator section 53, the divide-by-four frequency divider 42 generates the in-phase quarter-frequency signal (I) and the quadrature quarter-frequency signal (Q) of the local oscillation signal. The in-phase quarter-frequency signal (I) is supplied to the second fixed contact of the third switch 43 and the quadrature quarter-frequency signal (Q) is supplied to the second fixed contact of the fourth switch 44. Since the movable contact of the third switch 43 is switched to the second fixed contact and the movable contact of the fourth switch 44 is switched to the second fixed contact, the in-phase quarter-frequency signal (I) passes through the third switch 43 toward the fourth frequency mixer 29 via the first BF 45. The quadrature quarter-frequency signal (Q) passes through the fourth switch 44 toward the fifth frequency mixer 30 via the second BF 46.

The fourth frequency mixer 29 mixes the frequencies of the in-phase baseband signal (I) and the in-phase quarter-frequency signal (I) to supply the frequency-mixed signal, which is a sum-frequency signal of the in-phase baseband signal and the in-phase quarter-frequency signal, to the multiplexer 31. Similarly, the fifth frequency mixer 30 mixes the frequencies of the quadrature baseband signal (Q) and the quadrature quarter-frequency signal (Q) to supply the frequency-mixed signal, which is a sum-frequency signal of the quadrature baseband signal and the quadrature quarter-frequency signal, to the multiplexer 31. The multiplexer 31 selects from the two supplied frequency-mixed signals to generate the intermediate-frequency signal. The generated intermediate-frequency signal undergoes an automatic-gain-control amplification in the fourth automatic gain control amplifier 32 and is supplied to the movable contact of the second switch 33. Since the movable contact of the second switch 33 is switched to the second fixed contact, the intermediate-frequency signal passes through the second switch 33 and is supplied to the sixth frequency mixer 34. At this time, the local oscillator 40 generates the local oscillation signal that is amplified by the fourth BF 49 and is supplied to the sixth frequency mixer 34.

The sixth frequency mixer 34 mixes the frequencies of the intermediate-frequency signal and the local oscillation signal to supply the frequency-mixed signal to the fifth BPF 36. The fifth BPF 36 extracts a high-frequency transmitted signal that is a sum-frequency signal of the intermediate-frequency signal and the local oscillation signal from the frequency-mixed signal. The extracted high-frequency transmitted signal is amplified by the fourth high-frequency amplifier 38 to increase the transmission level and is supplied to the high-frequency signal output terminal (Tx) 39.

Figure 2:
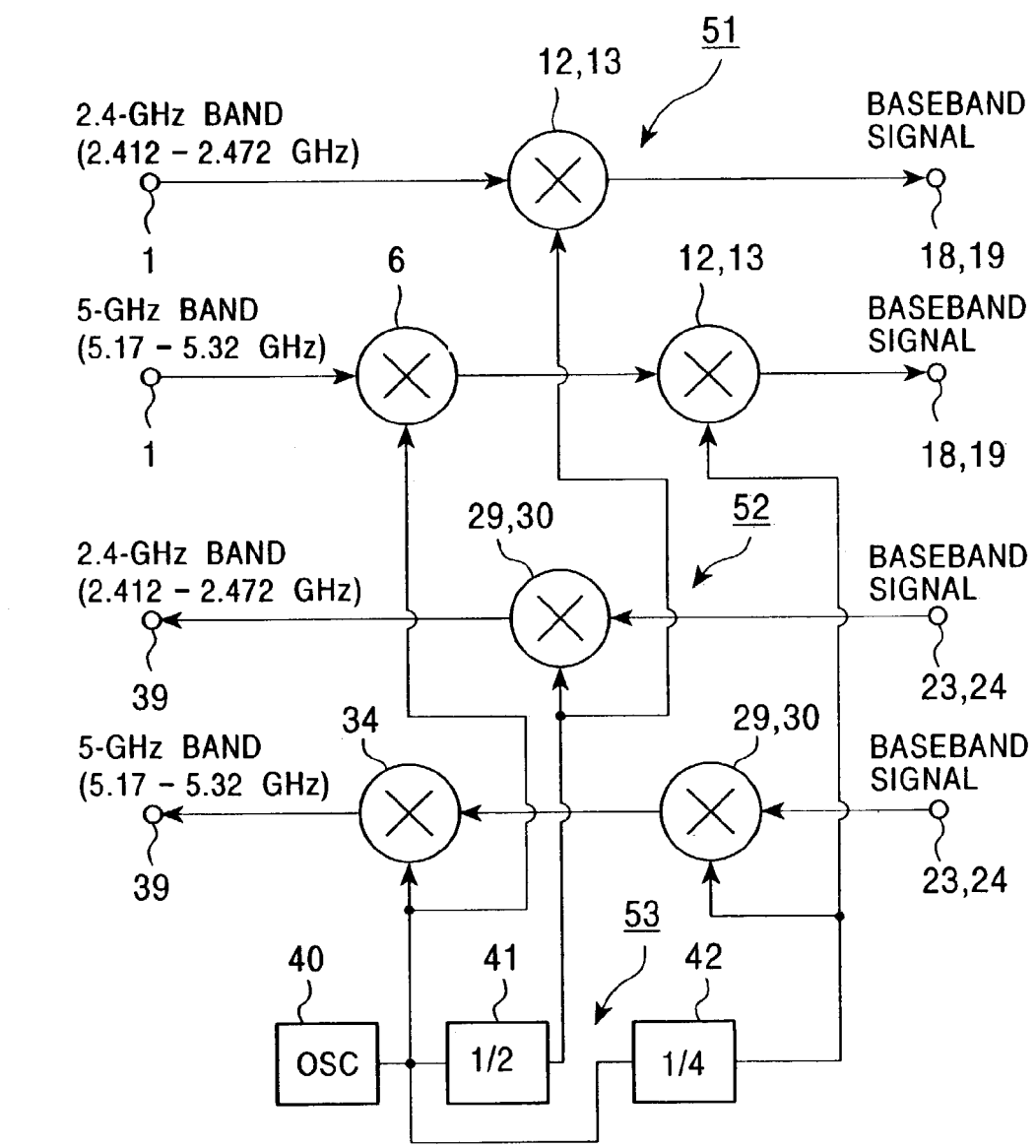
FIG. 2 shows the structure of a portion for performing frequency conversion in the dual-band frequency converter unit shown in FIG. 1.

FIG. 2 shows the structure of a portion of an embodiment for performing frequency conversion in the dual-band frequency converter unit shown in FIG. 1 . . . Referring to FIG. 2, the same reference numerals are used to identify the same elements shown in FIG. 1.

The dual-band frequency converter unit selects a signal within the frequency range between 4.136 GHz and 4.256 GHz or a signal within the frequency range between 4.824 GHz and 4.944 GHz as the local oscillation signal generated in the local oscillator 40, as shown in FIG. 2. When the 2.4-GHz high-frequency signal (having the frequency range between 2.412 GHz and 2.472 GHz) is transmitted or received, the signal within the frequency range between 4.824 GHz and 4.944 GHz is selected as the local oscillation signal for one-stage frequency conversion between the 2.4-GHz high-frequency signal and the baseband signal. When the 5-GHz high-frequency signal (having the frequency range between 5.17 GHz and 5.32 GHz) is transmitted or received, the signal within the frequency range between 4.136 GHz and 4.256 GHz is selected as the local oscillation signal for two-stage frequency conversion between the 5-GHz high-frequency signal and the baseband signal via the intermediate-frequency signal.

In other words, when the 2.4-GHz high-frequency signal (2.412 GHz to 2.472 GHz) is transmitted or received, the 2.4-GHz high-frequency signal and the half-frequency signal (2.412 GHz to 2.472 GHz) of the local oscillation signal (4.824 GHz to 4.944 GHz) are supplied to the frequency mixers 12, 13, 29, and 30 for the one-stage frequency conversion between the 2.4-GHz high-frequency signal and the baseband signal. In contrast, when the 5-GHz high-frequency signal (5.17 to 5.32 GHz) is transmitted or received, the local oscillation signal (4.136 GHz to 2.256 GHz) is supplied to the frequency mixers 6 and 34 and the quarter-frequency signal (1.034 GHz to 1.064 GHz) of the local oscillation signal is supplied to the frequency mixers 12, 13, 29, and 30 for the two-stage frequency conversion between the 5-GHz high-frequency signal and the baseband signal via the intermediate-frequency signal (1.034 GHz to 1.064 GHz).

As described above, the dual-band frequency converter unit according to the embodiment of the present invention is provided with the local oscillator 40 that generates the local oscillation signal in the local oscillator section 53, the divide-by-two frequency divider 41 that generates the half-frequency signal of the local oscillation signal, and the divide-by-four frequency divider 42 that generates the quarter-frequency signal of the local oscillation signal. In this dual-band frequency converter unit, the frequency range of the local oscillation signal generated in the local oscillator section 53 is slightly changed in accordance with the frequency band of the high-frequency signal to be transmitted or received. The half-frequency signal of the local oscillation signal or the quarter-frequency signal of the local oscillation signal is selected for the one-stage or two-stage frequency conversion between the high-frequency signal and the baseband signal. This enables the local oscillator section 53 to be used for two high-frequency bands, namely, 2.4 GHz and 5 GHz, thus reducing the production costs when compared with the case in which a converter unit functions only for 2.4-GHz high-frequency-band signals and another converter unit functions only for 5-GHz high-frequency-band signals and are separately manufactured. Furthermore, when the high-frequency band to be used is switched, all that is necessary is to simultaneously switch all of the switches 10, 33, 43, and 44 and slightly change the oscillation frequency range of the local oscillator 40. Accordingly, a dual-band frequency converter unit has high operability.

In the oscillation frequency range of the local oscillator 40 according to the embodiment of the present invention, the variable ratio between the minimum frequency of 4.136 GHz and the maximum frequency of 4.944 GHz is around 20%, thus the oscillation frequency can be adjusted within this range under the control of the phase-locked loop 47.

Although the divide-by-four frequency divider 42 that divides the frequency of the local oscillation signal by four is adopted in the local oscillator section 53 according to the embodiment of the present invention, two divide-by-two frequency dividers may be connected in series to provide the quarter-frequency signal of the local oscillation signal.

What is claimed is:

1. A dual-band frequency converter unit for selectively performing frequency conversion between a 2.4-GHz high-frequency-band signal or a 5-GHz high-frequency-band signal and a baseband signal by frequency mixing, the frequency converter unit comprising:

a local oscillator for generating a local oscillation signal;

a first frequency divider for generating a half-frequency signal of the local oscillation signal; and a second frequency divider for generating a quarter-frequency signal of the local oscillation signal, wherein frequency conversion between the 2.4-GHz high-frequency-band signal and the baseband signal is performed by frequency mixing using the half-frequency signal of the local oscillation signal, and wherein frequency conversion between the 5-GHz high-frequency-band signal and the baseband signal is performed by frequency mixing using the local oscillation signal and the quarter-frequency signal of the local oscillation signal.

2. A dual-band frequency converter unit according to claim 1, wherein the 2.4-GHz high-frequency-band signal is within the frequency range between 2.412 GHz and 2.472 GHz and the 5-GHz high-frequency-band signal is within the frequency range between 5.17 GHz and 5.32 GHz.

3. A dual-band frequency converter unit according to claim 1, wherein the local oscillation signal is within the frequency range between 4.136 GHz and 4.944 GHz, the half-frequency signal is within the frequency range between 2.068 GHz and 2.472 GHz, and the quarter-frequency signal is within the frequency range between 1.034 GHz and 1.236 GHz.

4. A dual-band frequency converter unit according to claim 3, wherein the local oscillation signal is within the frequency range between 4.824 GHz and 4.944 GHz when the 2.4-GHz high-frequency-band signal is transmitted or received and is within the frequency range between 4.136 GHz and 4.256 GHz when the 5-GHz high-frequency-band signal is transmitted or received.

* * * * *